United States Patent [19]
Babb et al.

[11] 3,737,667
[45] June 5, 1973

[54] ELECTRO-OPTICAL VIEWING DEVICE

[76] Inventors: Burton A. Babb, 6618 Briarhaven Drive, Dallas, Tex.; Edward L. Byer, 909 West Wildwood, Fort Wayne, Ind.; George S. Giffin, 2840 Titleist Drive, Salem, Va.; Robert E. Rife, 4530 Austin Drive, Fort Wayne, Ind.

[22] Filed: Aug. 18, 1971

[21] Appl. No.: 172,662

[52] U.S. Cl...........250/213 R, 250/213 VT, 250/227, 250/239, 350/35, 350/36
[51] Int. Cl........G02b 21/20, G02b 23/00, H01j 5/02
[58] Field of Search....................250/213 R, 213 VT, 250/227, 239; 350/35, 36

[56] References Cited

UNITED STATES PATENTS

| | | | |
|---|---|---|---|
| 2,871,372 | 1/1959 | Portenier et al. | 250/239 |
| 2,834,889 | 5/1958 | Fries | 250/213 VT |
| 3,400,291 | 9/1968 | Sheldon | 250/227 X |

OTHER PUBLICATIONS

Varo Inc. Electronics Products Div., "Infrared Viewer Mini Scope Model 5500", IEEE Conv., March 25, 1963, 1 Sheet Primary Examiner—James W. Lawrence
Assistant Examiner—T. N. Grigsby
Attorney—C. Cornell Remsen, Jr., Walter J. Baum, Paul W. Hemminger et al.

[57] ABSTRACT

An image intensifier tube and power supply elements are rigidly mounted and axially disposed within a housing to form an integral unit. The image intensifier includes a photocathode at one end, emitting electrons is response to light radiation, an intermediate electron multiplier, and a display screen at the other end displaying an image in response to electron impingement thereon. A detachable adjustable focus objective lens mounted at one end of the housing directs light from a source onto the photocathode and a detachable adjustable viewing lens mounted at the other end of the housing provides a view of the image on the display screen. The structure for mounting the objective lens is pre-collimated with the housing and image intensifier to permit interchangeability of lenses. A focus adjustment is provided between two selective positions of the objective lens. Critical collimation requirements can be readily obtained to facilitate use of a binocular arrangement. The mounting structure may also include an adjustable collimating means to provide axial alignment between the objective lens, image intensifier and viewing lens assembly.

10 Claims, 2 Drawing Figures

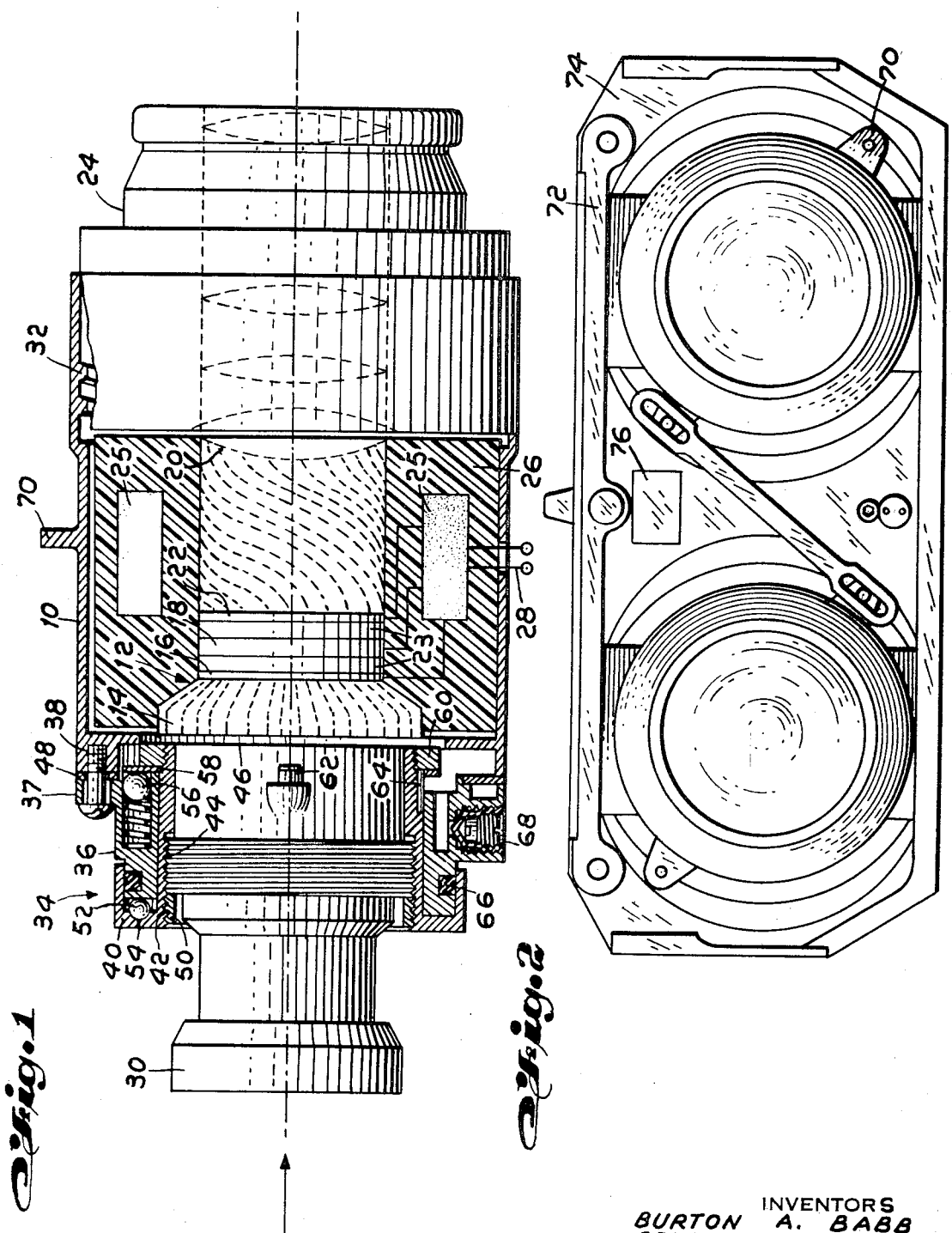

ELECTRO-OPTICAL VIEWING DEVICE

BACKGROUND OF THE INVENTION

1. Field of the Invention

This invention relates to a novel low light level electro-optical viewing device and particularly to an improved structure using an image intensifier tube in an integral ruggedized housing assembly having detachable adjustable optical elements and meeting critical collimation requirements.

2. Description of the Prior Art

A previous known low light level viewing device included a fixed focus objective lens section integral with one end of a housing which enclosed an image intensifier tube, and an eyepiece mounted at the other end. The image intensifier, including oscillator and voltage multiplier power supply elements, was a separate unit insertable into the housing - objective lens assembly and having connections to an external power source by leads connected through internal spring, sliding or pressure contacts between the tube and housing. Closely held mechanical tolerances are relied upon to hold the eyepiece and objective lens in alignment and the intensifier tubular diameter was adjusted by potting selected portions in an epoxy resin which varied the outer dimensions to obtain accurate collimation. No replacement or focal adjustment of the objective lens was possible and the intensifier tube required use of a tri-focal fiber optic faceplate having three different surface areas to provide a wide range of focus, with only the one limited area in use being in focus.

Two of these units were employed in a binocular arrangement. In such a case, collimation requirements are very critical in order to provide the same optical characteristics to both eyes of a viewer. While other known monocular devices have included interchangeable objective and eyepiece optical assemblies, there were used in different applications which did not require accurate collimation.

SUMMARY OF THE INVENTION

It is therefore the primary object of the present invention to provide an improved low light level electro-optical viewing device having a closely collimated structure including a ruggedized image intensifier housing assembly with adjustable focus interchangeable optical elements. Another object is to provide a simplified adjustable collimation of the system. A further object is to provide an objective lens assembly which is adjustable between two selective focus positions.

These objects are achieved by a novel arrangement of an image intensifier tube axially disposed and rigidly mounted in a housing together with rigidly mounted power supply elements which form an integral unit with the housing. A detachable adjustable focus objective lens is mounted at one end adjacent the planar faceplate photocathode of the image intensifier and a detachable adjustable viewing lens at the opposite end adjacent the display screen, with the tube including an intermediate electron multiplier between the input and output ends. An adjustable collimating device may be mounted at the objective lens end to provide axial alignment of the various elements. The mounting structure for securing the objective lens to the tube structure is pre-collimated with the integral tube and housing so that interchangeable objective lenses may be utilized. A rotatable mounting structure permits focus adjustment of the objective lens between two selective positions. The details of the invention will be more fully understood and other objects and advantages will become apparent in the following description and accompanying drawings.

BRIEF DESCRIPTION OF THE DRAWINGS

FIG. 1 shows an assembly of the novel electro-optical viewing device in partial cross-section, and FIG. 2 shows two such devices mounted on a common support to form binoculars.

DESCRIPTION OF THE PREFERRED EMBODIMENTS

As shown in FIG. 1, a cylindrical housing 10, of a suitable metal such as aluminum, encloses an axially positioned evacuated image intensifier tube 12 including a planar fiber optic faceplate 14 at the input end having an electron emissive photocathode 16 on the internal face, a closely spaced intermediate microchannel plate electron multiplier 18 and an adjacent fiber optic bundle display screen 20 at the output end including a suitable phosphor coating 22 on the inner face. The various elements of the tube are sealed together with suitable sealing rings 23 to provide an evacuated enclosure. The output fiber optical bundle includes a 180° twist of all of the optical fibers to turn the optics in the correct direction to provide a normal viewing angle through an attached eyepiece lens system 24. The photocathode is preferably of a sensitive material, such as a standard extended red S-20 type, responsive to low level light radiation from sources in the visible as well as infrared spectral ranges. The combination of lenses and image intensifier tube is designed to provide a unity optical magnification while amplifying the light level for use in low light level or night vision conditions.

The power supply circuit elements 25 for the image intensifier tube include an oscillator, voltage multiplier and internal leads which are rigidly mounted and coaxially positioned in the surrounding space 26 between the tube section 12 and the housing 10. The power supply provides suitable direct voltages to the photocathode, electron multiplier and phosphor coating. The entire tube and power supply assembly are preferably secured within the housing by potting in an epoxy resin to form an integral unit. External leads 28 are brought out directly through an opening in the housing for connection by firmly crimped plug contacts to a direct current source such as a battery which is mounted externally. Potting of the tube, power supply elements and leads provides a rigid unitary assembly which avoids the use of unreliable fragile sliding or pressure contacts as in prior systems. In addition, by use of precise optical measurement techniques during the potting of the housing and tube as an integral unit, a collimation adjustment is made before the resin hardens to provide axial alignment and establish a reference for the various components as well as a firm support for the attachment of the eyepiece system 24 at the viewing end and an objective lens system 30 at the input end. The planar faceplate of the tube is made parallel to the front surface of the housing, with the inner diameter of the housing opening providing a reference for collimation.

The eyepiece assembly 24 is positioned adjacent the end of output fiber optic display screen 20 and engages a threaded end 32 of the housing 10. The eyepiece section is thus removable and interchangeable with other eyepieces and the threaded engagement with the housing provides adjustable focusing for viewing by different persons. Collimation of the eyepiece is obtained by parcentering with respect to the housing mounting surfaces using precise measurement techniques and by maintaining close manufacturing tolerances of the threaded portion 32 of the housing. This provides proper axial alignment with respect to the housing and image intensifier unit which are collimated during the prior potting procedure and assures collimation of interchangeable viewing lenses.

The objective lens assembly 30 is secured to the housing and image intensifier unit by a mounting structure 34 which includes a collar 36, having an outer flange 37 fixedly secured to the housing by a set of screws 38 and a focus adjustment ring 40 rotatably mounted on the collar and having an internal threaded diameter portion 42. A portion of the outer diameter 44 of the objective lens assembly has a correspondingly threaded section to permit turning of the lens about its axis into the ring 40, with the inner end 46 positioned adjacent the flat fiber optic faceplate 14 of tube 12. The ring and collar may be collimated during assembly with respect to the housing reference diameter and optical center line by precise optical measurement techniques and by maintaining close mechanical tolerances. The objective lens assembly is par-centered with respect to the mounting surface and is then properly aligned when inserted onto the mounting structure. Thus, interchangeable lenses can be used which will also be collimated when mounted on the pre-collimated tube - housing module and mounting structure.

In one variation, a separate collimation adjustment may be made by a collimating plate 48 secured to the collar and positioned between the collar and housing. This is accomplished by use of a pair of screws 38 loosely positioned in holes in plate 48 of slightly larger diameter than the threaded portion of the housing to permit lateral movement between the axis of the objective lens assembly and mounting structure with respect to the tube and housing axis in the plane perpendicular to the latter axis. After optical measurements to align the lens assembly and mounting with the reference housing and tube axis, the screws are tightened to secure the mounting and collimating plate to the housing and fix the positions.

A fine focus adjustment of the objective lens within the mounting structure is provided by turning the lens to move along the threaded portion 42 of ring 40. This position is then locked in place by a locking nut 50 so that the objective lens 30 and ring 40 form an integral unit which can be rotated together. A knurled outer surface of ring 40 facilitates manual rotation.

The objective lens is also provided with two selective focus positions between the limits of infinity and approximately 10 inches. This is accomplished by rotation of ring 40 and lens assembly 30 about the reference axis through an angle of approximately 78° with respect to the fixed collar 36. A ball and detent mechanism facilitates rotation of the ring about the collar. A steel ball 52 rides on the internal cam surface 54 of the ring which has a curved ramp between detents at the two predetermined fixed positions to selectively engage the ball. A stationary spring loaded ball 56 takes up clearances between elements and assures contact of ball 52 with the varying cam surface while permitting rotation of a retaining plate 58 with the ring between limits corresponding to the detent positions. The objective lens is also continuously adjustable between these limits and usable at intermediate points as well as the more commonly used detented end positions.

The retaining plate 58 and a threaded retainer ring 60 hold ball 56 in the longitudinal position and a wider diameter portion of the plate 58 moves against a stop 62 on the lens assembly to limit the rotation to correspond with the fixed focus positions. Use of a planar fiber optic faceplate for the image tube with an adjustable focus objective lens eliminates the need for the more complex costly tri-focal faceplate used with the fixed focus lens of the prior art system. In addition, the entire faceplate area is used for distortion free viewing, rather than limited areas for particular ranges as with the tri-focal device.

The adjustable lens mounting structure also includes a dowel pin 64 which secures plate 58 to the ring 40 to prevent radial movement of the plate. A quad ring seal 66 of a suitable flexible material prevents leakage of any undesirable substances into or out of the spaces between the rotating surfaces. In addition, purge valve 68 provides an opening for supplying dry gas to eliminate moisture from air spaces in the system such as between the objective lens and intensifier tube faceplate and between the eyepiece and viewing screen. A channel along the inner diameter of the housing is incorporated during the potting procedure to provide an air passageway between the ends of the tube-housing unit.

As shown in FIG. 2, the housing 10 preferably includes mounting flanges 70 to permit securing the entire monocular optical device in a frame 72 on a transverse mounting plate or support mask 74. As illustrated, two such individually adjustable viewing devices may be utilized in a common support to provide a pair of binoculars for normal viewing with two eyes. Precise collimation of each viewing device meets the critical requirements of binoculars to provide the same optical characteristics to both eyes of the person using the device. The battery power source is preferably mounted on the support mask and is connected to the leads 28 of the image tube. An additional small infrared radiation source 76 may also be mounted on the frame or mask for illuminating close targets.

The present invention thus provides a rugged low light level viewing device having adjustable focus interchangeable optical elements which are precisely collimated. While only a single embodiment has been illustrated and described, it is to be understood that many variations may be made in the design and configuration without departing from the scope of the invention as set forth in the accompanying claims.

What is claimed is:
1. An electro-optical viewing device comprising:
a housing;
image intensifier means axially disposed and rigidly mounted in said housing;
power supply means for said image intensifier means rigidly mounted in said housing adjacent said image intensifier means;
said housing, image intensifier means and power supply means forming a rigid integral unit providing an optical collimation reference and support structure;

said image intensifier means including a photocathode positioned at one end emitting electrons in response to light radiation thereon, an intermediate electron multiplier, and a display screen positioned at the other end displaying an image in response to electron impingement thereon;

first optical means including adjustable focusing means detachably and rotatably secured on said housing for directing and focusing light radiation from a source onto said photocathode;

mounting means positioned at said one end of said housing for securing said first optical means thereto, said mounting means and first optical means being optically aligned with respect to said integral unit collimation reference; and second adjustable focus optical means detachably mounted on said housing at said other end for viewing said image on said display screen.

2. The device of claim 1 wherein said mounting means includes adjustable collimating means for axially aligning said first optical means with said image intensifier means and said second optical means.

3. The device of claim 1 wherein said first optical means includes an objective lens assembly, said mounting means being pre-collimated with respect to said integral housing and image intensifier to interchangeably accommodate a plurality of like objective lens assemblies.

4. The device of claim 1 wherein said first optical means includes an objective lens assembly, and said mounting means includes means for establishing two selective fixed focus positions, and means for adjusting the focus of said objective lens between said two positions.

5. The device of claim 3 wherein said second optical means includes a viewing lens assembly in adjustable threaded engagement with said housing, said housing being adapted to accommodate a plurality of interchangeable viewing lenses.

6. The device of claim 4 wherein said focus adjusting means includes a collar fixedly secured to said housing and a focus adjustment ring rotatably engaging said collar and fixedly secured to said objective lens assembly, said ring and objective lens assembly being rotatable between said two selective fixed positions, and means for locating and holding said ring in said positions, said ring including means for threadably engaging said objective lens assembly to provide a fine focus adjustment.

7. The device of claim 5 wherein said image intensifier includes a planar fiber optic faceplate disposed adjacent said objective lens assembly and having said photocathode on an inner surface of said faceplate, said electron multiplier including an intermediate micro-channel plate, and a fiber optic display screen disposed adjacent said viewing lens assembly and having a phosphor coating on an inner surface of said display screen.

8. The device of claim 6 wherein said image intensifier means is disposed in a sealed evacuated enclosure, said power supply means surrounding a portion of said enclosure, said enclosure and power supply means being embedded in a hardened epoxy resin within said housing to form an integral unit therewith.

9. The device of claim 8 including support means for mounting two like electro-optical viewing devices adjacent one another to form a binocular viewing device.

10. The device of claim 9 including a source of direct voltage secured on said support means and connected to said power supply means of each of said electro-optical viewing devices.

* * * * *